US009343839B2

(12) United States Patent  (10) Patent No.: US 9,343,839 B2
Stone  (45) Date of Patent: May 17, 2016

(54) WALL-MOUNT BOX WITH ISOLATED INTERIOR REGIONS

(75) Inventor: David Stone, Irvine, CA (US)

(73) Assignee: CommScope Technologies LLC, Hickory, NC (US)

( * ) Notice: Subject to any disclaimer, the term of this patent is extended or adjusted under 35 U.S.C. 154(b) by 91 days.

(21) Appl. No.: 14/344,986

(22) PCT Filed: Sep. 6, 2012

(86) PCT No.: PCT/US2012/053924
§ 371 (c)(1), (2), (4) Date: Oct. 14, 2014

(87) PCT Pub. No.: WO2013/039758
PCT Pub. Date: Mar. 21, 2013

(65) Prior Publication Data
US 2015/0038007 A1  Feb. 5, 2015

Related U.S. Application Data

(60) Provisional application No. 61/535,534, filed on Sep. 16, 2011.

(51) Int. Cl.
*H01R 13/60* (2006.01)
*H01R 13/514* (2006.01)
*H02G 3/00* (2006.01)
*H02G 3/08* (2006.01)
*H01R 43/18* (2006.01)

(52) U.S. Cl.
CPC .............. *H01R 13/514* (2013.01); *H01R 43/18* (2013.01); *H02G 3/00* (2013.01); *H02G 3/086* (2013.01); *Y10T 29/49169* (2015.01)

(58) Field of Classification Search
CPC ........ H01R 13/514; H01R 43/18; H01R 3/00; H01R 13/086; H01R 13/66

USPC .......................................................... 439/535
See application file for complete search history.

(56) References Cited

U.S. PATENT DOCUMENTS

| | | | | |
|---|---|---|---|---|
| 5,135,411 | A * | 8/1992 | Wiley et al. | 439/539 |
| 6,786,766 | B1 * | 9/2004 | Chopra | H01R 13/66 439/535 |
| 2006/0148321 | A1 | 7/2006 | Macor | |
| 2010/0080513 | A1 | 4/2010 | Hamada et al. | |
| 2014/0092943 | A1 * | 4/2014 | Hariz | H04B 3/54 375/211 |

FOREIGN PATENT DOCUMENTS

| | | |
|---|---|---|
| EP | 0 274 487 | 1/1995 |
| JP | 2008-281807 | 11/2008 |
| KR | 10-2008-0113804 | 12/2008 |

OTHER PUBLICATIONS

International Search Report for International Application No. PCT/US2012/053924 mailed Feb. 18, 2013.

* cited by examiner

*Primary Examiner* — Jean F Duverne
(74) *Attorney, Agent, or Firm* — Merchant & Gould P.C.

(57) ABSTRACT

Certain types of wall-mount boxes provide a local power receptacle in a first interior region that is physically isolated from a second interior region. The local power receptacle is accessible from an exterior of the box. The local power receptacle is electrically connected to an internal connector interface that is accessible from the second interior region. An electronic device may be installed in the second interior region and electrically connected to the local power receptacle via the internal connector interface. Second receptacles are disposed in the second interior region and coupled to (or are integral with) the electronic device. The second receptacles are accessible from the exterior of the box.

20 Claims, 10 Drawing Sheets

US 9,343,839 B2

WALL-MOUNT BOX WITH ISOLATED INTERIOR REGIONS

This application is being filed on 14 Mar. 2014, as a US National Stage of PCT International Patent application No. PCT/US2012/053924, filed 6 Sep. 2012 in the name of ADC Telecommunications, Inc., a U.S. national corporation, applicant for the designation of all countries except the U.S., and, David Stone, a citizen of Canada, applicant for the designation of the U.S. only, and claims priority to U.S. Patent Application Ser. No. 61/535,534 filed on 16 Sep. 2011 and which applications are incorporated herein by reference. To the extent appropriate, a claim of priority is made to each of the above disclosed applications.

BACKGROUND

In modern homes and businesses, various types of power and data outlets may be provided in the walls to facilitate connection of computers, phones, printers, battery chargers, and other electronic devices to power and/or data sources. For example, an AC electrical outlet may be provided for distributing local power; and a telephone jack or other network jack may be provided for distributing telecommunications signals.

Many modern-day electrical devices are powered by modular transformers or power converters. These modular transformers convert 120 volt AC electrical power into a lower voltage AC or DC current for powering the electrical device. Certain types of these modular transformers plug directly into a wall outlet, with a smaller cord that extends to the device powered. Usually, the modular transformers are rather bulky, heavy, and take up a good bit of space.

In optical fiber-to-the-wall applications in which the in-wall jack is an optical jack instead of a conventional network jack, an electrically powered fiber-to-copper media converter is required to convert optical signals to electrical signals. Usually, the media converters are rather bulky, heavy, and take up a good bit of space.

SUMMARY

Aspects of the present disclosure relate to electrical wall-mount boxes. Each wall-mount box provides a local power receptacle that is physically isolated from a second interior region of the wall-mount box. The local power receptacle is accessible from an exterior of the box. The local power receptacle is electrically connected (e.g., hard-wired) to an internal connector interface that is accessible from the second interior region.

In accordance with some aspects, an electronic device may be disposed in the second interior region and electrically connected to the local power receptacle via the internal connector interface. In certain implementations, the electronic device provides a second receptacle that is accessible from an exterior of the box. In other implementations, the electronic device is coupled to a separate second receptacle that is accessible from an exterior of the box.

In various implementations, the electronic device may include a media converter, a repeater, and a router. In one example implementation, the electronic device is configured to convert the local power from AC current to DC current. In another example implementation, the electronic device is configured to convert the local power from one voltage level to another voltage level.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Aspects of the disclosure are directed to electrical wall-mount boxes having physically isolated chambers. A local power receptacle is disposed in one chamber and a second receptacle is disposed in the second chamber of each box. Each of the receptacles is accessible from an exterior of the box. The local power receptacle is electrically connected to an internal connector interface from which electronics disposed within the second chamber obtain local power. The electronics are coupled to or integral with the second receptacle.

Installation of the wall-mount boxes includes disposing the wall-mount box in a wall and connecting the local power receptacle inside the first chamber to power cabling routed through the wall in the conventional way. One or more electronic devices are disposed in the second chamber and electrically connected to the internal connector interface to obtain local power at the electronic devices.

A barrier wall separates the first and second chambers of the wall-mount box. The local power receptacle has been pre-connected to the internal connector interface prior to installation. Accordingly, electronics may be installed in the second chamber of the box during installation of the wall-mount box without danger of shocking or electrocuting the installer.

In some implementations, the electronic device defines a second receptacle that is accessible from an exterior of the box. In other implementations, the electronic device couples to a second receptacle that is accessible from an exterior of the box. Non-limiting examples of electronic devices include media converters, routers, and repeaters.

Figure 1:
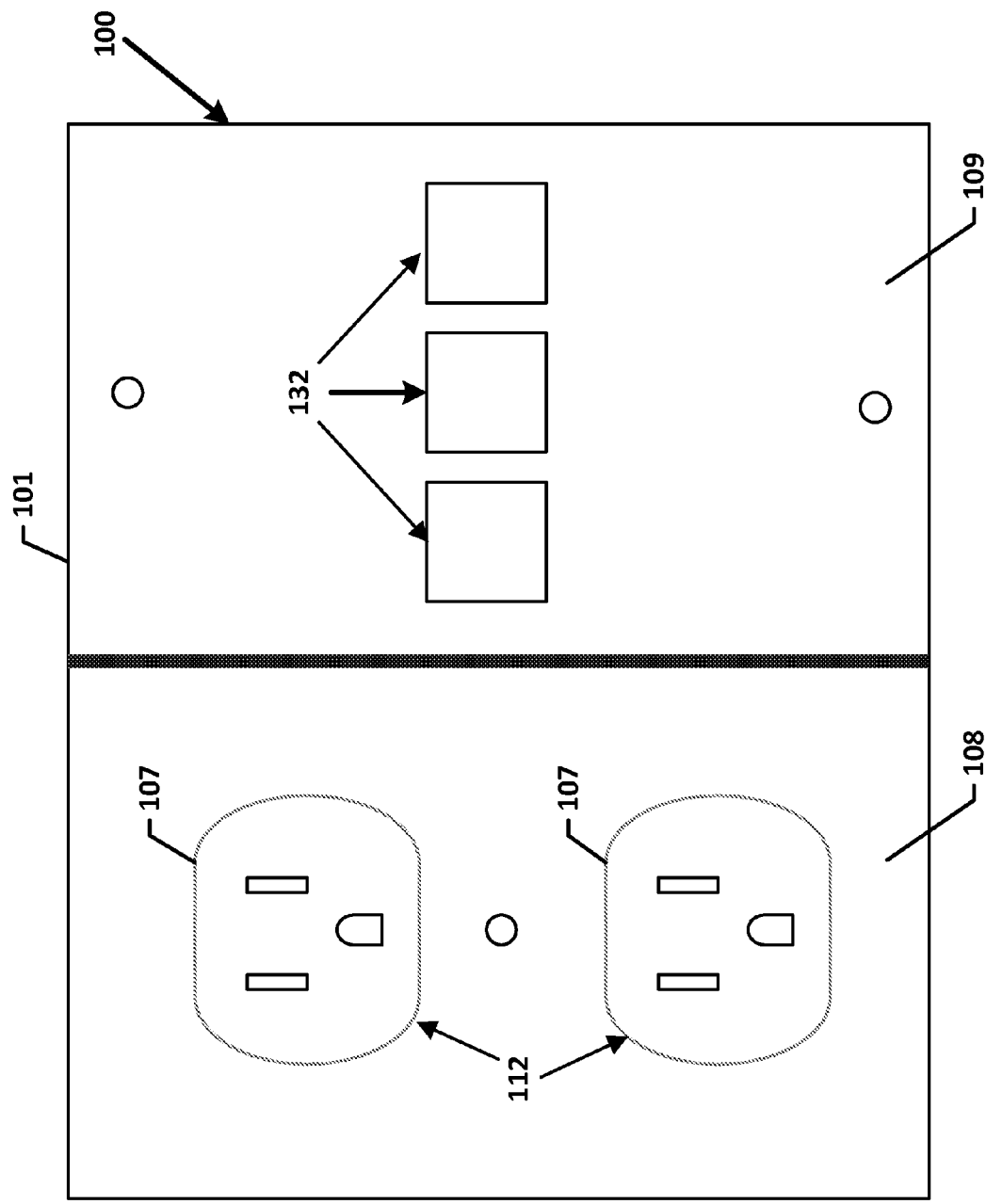
FIG. 1 is a front elevational view of a wall-mount box including power receptacles disposed in a first interior region and accessible through a first front plate; the wall-mount box also including additional a second interior region in accordance with aspects of the disclosure.
Figure 2:
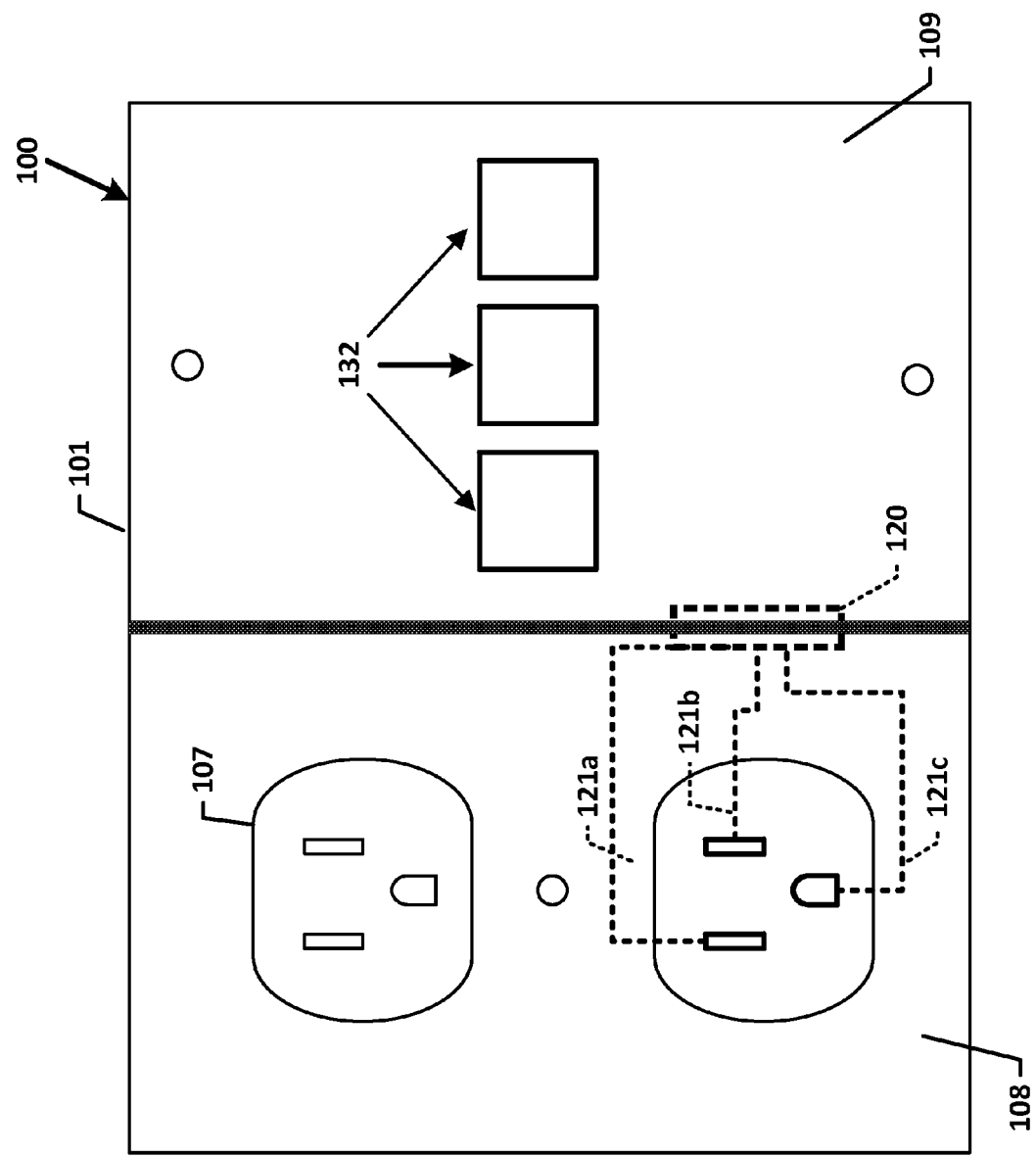
FIG. 2 is a front elevational view of the wall-mount box of FIG. 1 showing an internal connector interface electrically connected to one of the power receptacles.
Figure 3:
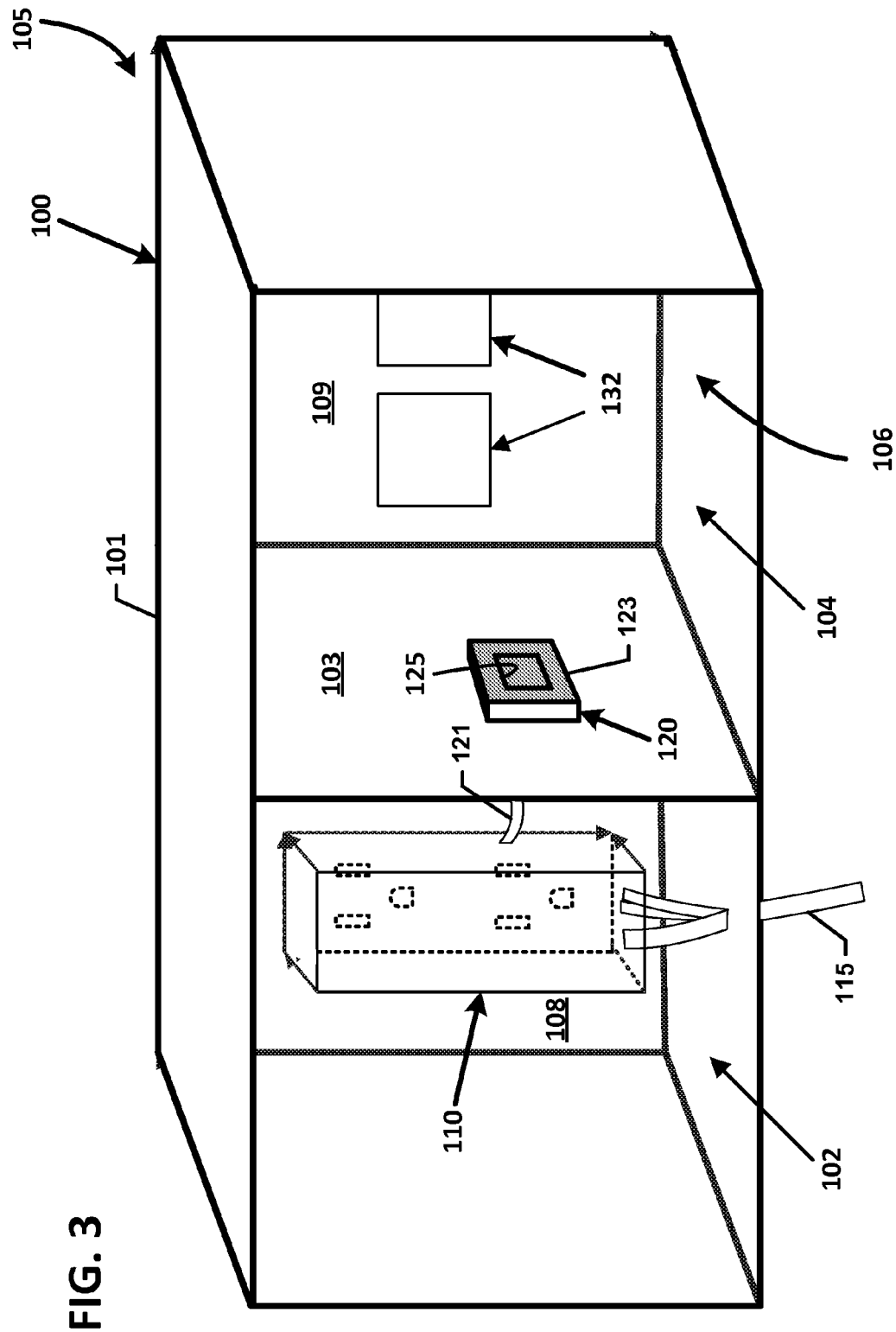
FIG. 3 is a schematic diagram showing a rear isometric view of the wall-mount box of FIG. 2 with the rear wall removed so that the internal connector interface is visible.

FIGS. 1-3 illustrate one example wall-mount box 100 including a body 101 defining a first interior region 102 and a second interior region 104. The body 101 has a front 105 and a rear 106. Each interior region 102, 104 borders both the front 105 and the rear 106. A power connector interface 110 is disposed in the first region 102. Power conducting wires 115 are routed to the power connector interface 110 (e.g., in the conventional way).

The first and second interior regions 102, 104 are separated by a barrier wall 103 or other divider that inhibits uncontrolled electrical discharges in one region 102, 104 from entering the other region 102, 104. In some implementations, the barrier wall 103 is formed of plastic or another insulating material. For example, the barrier wall 103 may be integrally formed with a plastic body 101. In another example implementation, a plastic insert may be secured within a metal box to separate the regions 102, 104. In other implementations, the barrier wall 103 may be integrally formed with a metal body 101. In still other implementations, the barrier wall 103 may be formed of metal and coupled to a plastic housing if the barrier wall 103 also includes a dedicated grounding connection.

In some implementations, the front 105 of the body 101 is open and the rear 106 of the body 101 is closed. One or more face plates may be disposed across the open front 105 of the body 101 to close the body 101. For example, in FIG. 1, a first face plate 108 is disposed over the front 105 of the body 101 to close the first interior region 102 and a second face plate 109 is disposed over the front 105 of the body 101 to close the second interior region 104. In other implementations, a single face plate may extend across the front 105 of the body 101. In still other implementations, the body 101 has a generally closed front 105 defining apertures and a generally open rear 106.

At least the first face plate 108 defines one or more through-passages 107 that provide access to the power connector interface 110 from an exterior of the body 101 through the front plate 108. For example, the through-passages 107 may provide access to receptacles 112 of the power connector interface 110. In some implementations, the receptacles 112 include conventional power receptacles that are sized and configured to receive the prongs of a plug of a conventional power cord. In the example shown, the receptacle 112 is sized and shaped to receive a NEMA 5 type plug. In other implementations, however, the receptacle 112 may be sized and shaped to receive a power plug configured according to any standard worldwide (e.g., a CEE 7/16 type plug, a CEE 7/17 type plug, a BS 546 type plug, a BS 1363 type plug, an SI 32 type plug, and an AS/NZS 3112 type plug).

In some implementations, the power connector interface 110 includes a single receptacle 112 and the first face plate 108 defines sufficient number of through-passages 107 for a single receptacle 112. In certain implementations, the first face plate 108 defines a single through-passage 107 per receptacle 112. In other implementations, the first face plate 108 may define a through-passage 107 for each receiving slot of the receptacle 112. In still other implementations, the power connector interface 110 includes multiple receptacles 112 and the first face plate 108 defines a sufficient number of through-passages 107 to accommodate each receptacle 112. In the example shown, the power connector interface 110 forms a dual receptacle power connector interface 110 and the first face plate 108 defines two apertures 107.

In some implementations, the second face plate 109 defines one or more through-passages 132. In the example shown in FIG. 1, the second face plate 109 defines three through-passages 132. In other implementations, the second face plate 109 may define a greater or lesser number of through-passages 132. The through-passages 132 provide access to one or more second receptacles 130 through the second front plate 109 as will be described in more detail herein. In some implementations, the second receptacles 130 include telecommunications ports. In certain implementations, the second receptacles are configured to receive one or more fiber cables. In certain implementations, the second receptacles are configured to receive one or more electrical cables.

As shown in FIGS. 2 and 3, an example internal connector interface arrangement 120 is disposed on the body 101 of the wall-mount box 100. The internal connector interface arrangement120 is unaccessible through the front 105 of the body 101. In some implementations, the connector interface arrangement 120 is located at a barrier wall 103 extending between the front 105 and rear 106 of the body 101 to separate the interior regions 102, 104. In certain implementations, the connector interface arrangement 120 includes a receptacle that extends through the barrier wall 103. In various other implementations, however, the internal connector interface arrangement 120 may be located at a rear wall, top wall, bottom wall, or side wall of the body 101.

The internal connector interface arrangement 120 is electrically connected to the power connector interface 110. In some implementations, one or more conductors 121 are hard-wired from the power connector interface 110 to termination contacts of the internal connector interface 120. For example, an active conductor 121a, a neutral conductor 121b, and a ground conductor 121c may be routed to the internal connector interface 120. In other implementations, one or more conductors 121 are terminated at a plug 122 that is inserted into a port of the internal connector interface 120. The internal connector interface 120 defines a port 125 that is accessible from the second interior region 104. Local power from the power connector interface 110 is provided to the port 125 of the internal connector interface 120.

In some implementations, the port 125 of the internal connector interface 120 is configured to receive an RJ plug (e.g., an RJ-45 plug). In other implementations, the port 125 of the internal connector interface 120 is configured to receive a USB plug (e.g., a conventional USB, a micro-USB, etc.). In still other implementations, the port 125 of the internal connector interface 120 is configured to receive a plug of a power cord (e.g., a NEMA 1 type plug, a NEMA 5 type plug, a CEE 7/16 type plug, a CEE 7/17 type plug, a BS 546 type plug, a BS 1363 type plug, an SI 32 type plug, and an AS/NZS 3112 type plug). In still other implementations, the port 125 may be configured to receive any type of plug capable of terminating electrical conductors.

Figure 4:
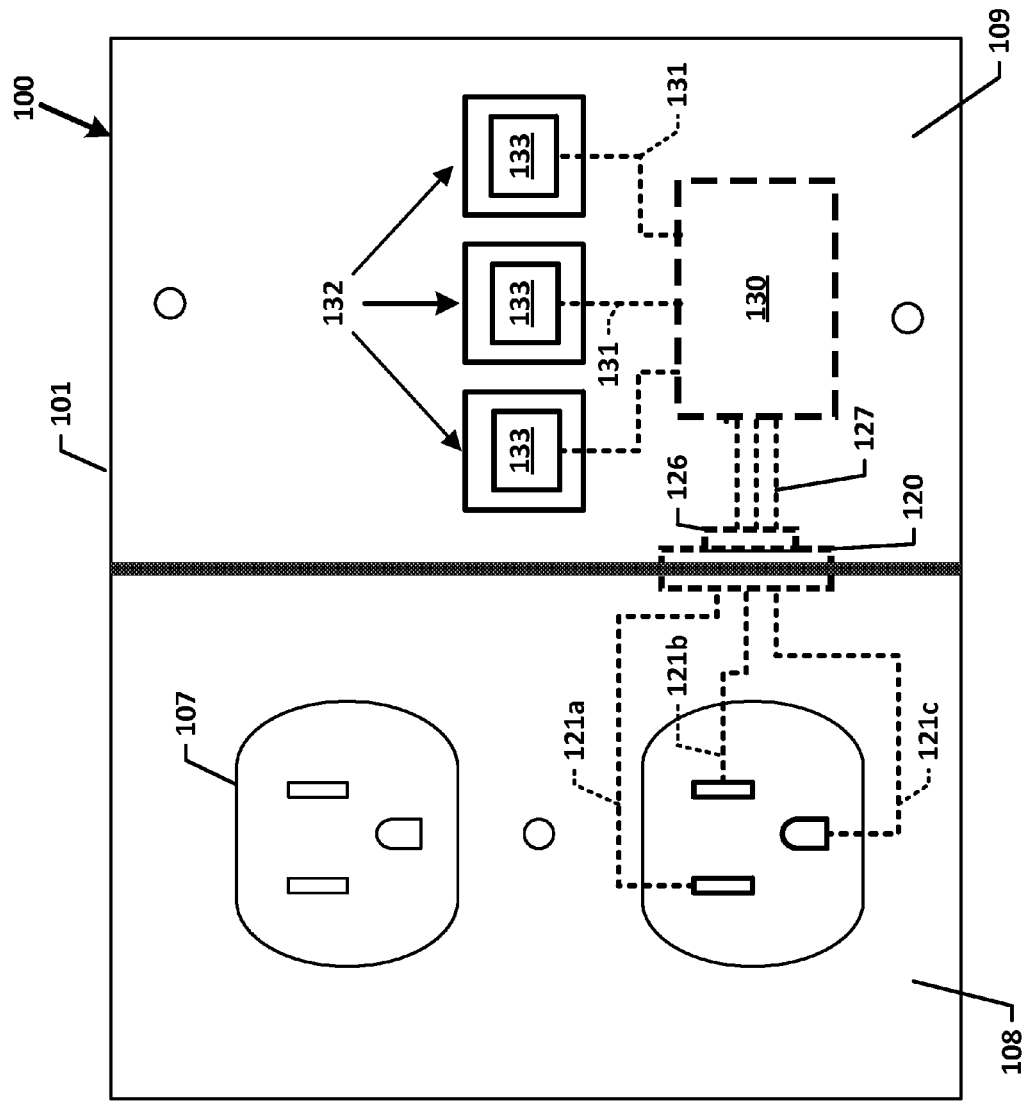
FIG. 4 is a front elevational view of the wall-mount box of FIG. 2 showing an electronic device disposed in the second interior region and electrically connected to the internal connector interface.
Figure 5:
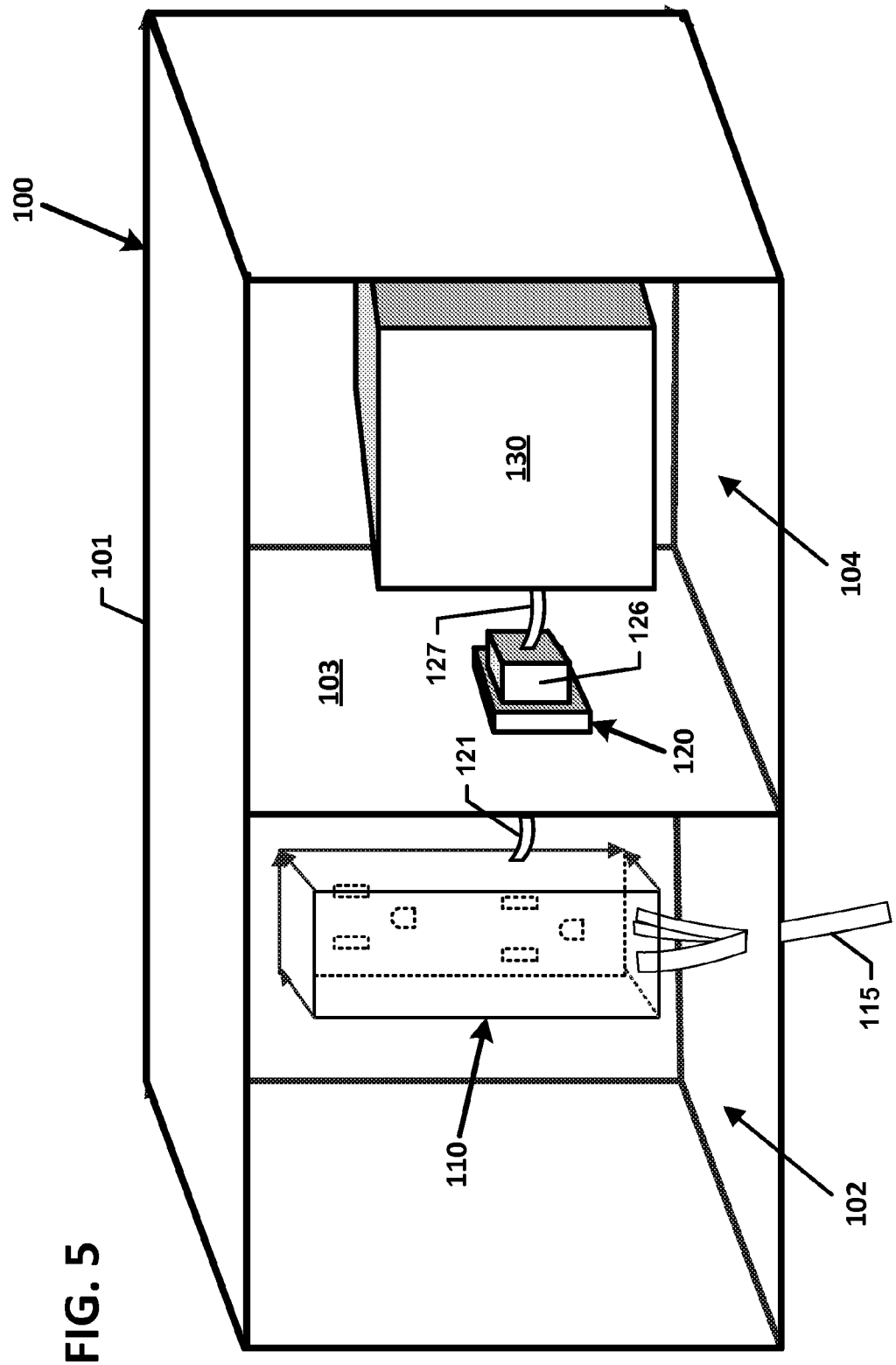
FIG. 5 is a schematic diagram showing a rear isometric view of the wall-mount box of FIG. 4 with the rear wall removed so that the electronic device and internal connector interface are visible.

FIGS. 4 and 5 show an electronic device 130 disposed in the second interior region 104 of the body 101. In some implementations, the electronic device 130 includes a media converter. In one implementation, the electronic device 130 converts AC power received from the internal connector interface 120 to DC power.

In another implementation, the electronic device 130 converts a certain level of AC voltage to a different level of AC voltage. In other implementations, the electronic device 130 includes a router. In still other implementations, the electronic device 130 includes a repeater.

The electronic device 130 includes a dedicated connector 127 that is routed through the second interior region 104 and electrically connected to the internal connector interface arrangement 120 at the second interior region 104. For example, the dedicated connector 127 may be terminated at a plug 126 that is configured to be inserted into the port 126 of the internal connector interface arrangement 120. In other implementations, the internal connector interface arrangement 120 includes a connector protruding into the second region 104 and the electronic device 130 defines a socket configured to receive the protruding connector. In still other implementations, a cable terminated at both ends may be routed between a receptacle defined by the internal connector interface arrangement 120 and a receptacle defined by the electronic device 130.

In some implementations, the electronic device 130 defines one or more second receptacles 133 that are accessible from an exterior of the body 101. For example, the second receptacles 133 may be aligned with the through-openings 132 to enable the second receptacles 133 to receive plugs from an exterior of the body through the front plate 109. In certain implementations, the second receptacles 133 define telephone jacks. In one implementation, the second receptacles 133 define USB jacks. In one implementation, the second receptacles 133 define RJ45 jacks. In certain implementations, the second receptacles 133 define optical fiber adapters. In other implementations, the electronic device 130 is coupled to one or more devices that define the second receptacles 133. In the example shown in FIG. 4, an example electronic device 130 is coupled (see lines 131) to three second receptacles 133.

In accordance with some aspects, the wall box 100 is manufactured by forming two interior regions 102, 104 in a body 101 of a wall box 100 by disposing a barrier wall 103 in a body 101 of the wall box 100. In certain implementations, the barrier wall 103 extends between the front 105 and rear 106 of the body 101. The barrier wall 103 also extends between the top and bottom of the body 101. An internal connector interface 120 is installed on the body 101. The internal interface 120 has a first side or port that is accessible from the first interior region 102 and a second side or port that is accessible from the second interior region 104.

In accordance with other aspects, the manufactured wall box 100 is installed in a wall so that the front 105 of the wall box 100 faces outward from the wall. A conventional power cable routed through the wall electrically connects the power interface 110 to the main power lines for the building or facility. The electronic device 130 is disposed in the second region 104 of the box 100 and electrically connected to the internal connector interface 120. For example, a dedicated connector 127 of the electronic device 130 may be routed to the barrier wall 103 and plugged into the internal connector interface 120 to draw power from the power interface 110.

The electronic device 130 is connected to local power through the internal connector interface 120. In certain implementations, the electronic device 130 is connected to local power after the power interface 110 has been installed and connected to the main power lines. Because the second interior region 104 in which the electronic device 130 is disposed is isolated from the first interior region 102 in which the power interface 110 is disposed, an installer will not be shocked or electrocuted by the power interface 110 while installing the electronic device 130.

In certain implementations, one or more second receptacles 133 also are installed in the second interior region 104 of the wall box 100. The second receptacles 133 are coupled to the electronic device 130. For example, the electronic device may provide transformed power (e.g., AC to DC, change in voltage level, etc.) to the second receptacles 133. One or more front plates 108, 109 are installed over the open front 105 of the wall box 100 to close off the interior regions 102, 104 from the exterior of the wall.

Figure 6:
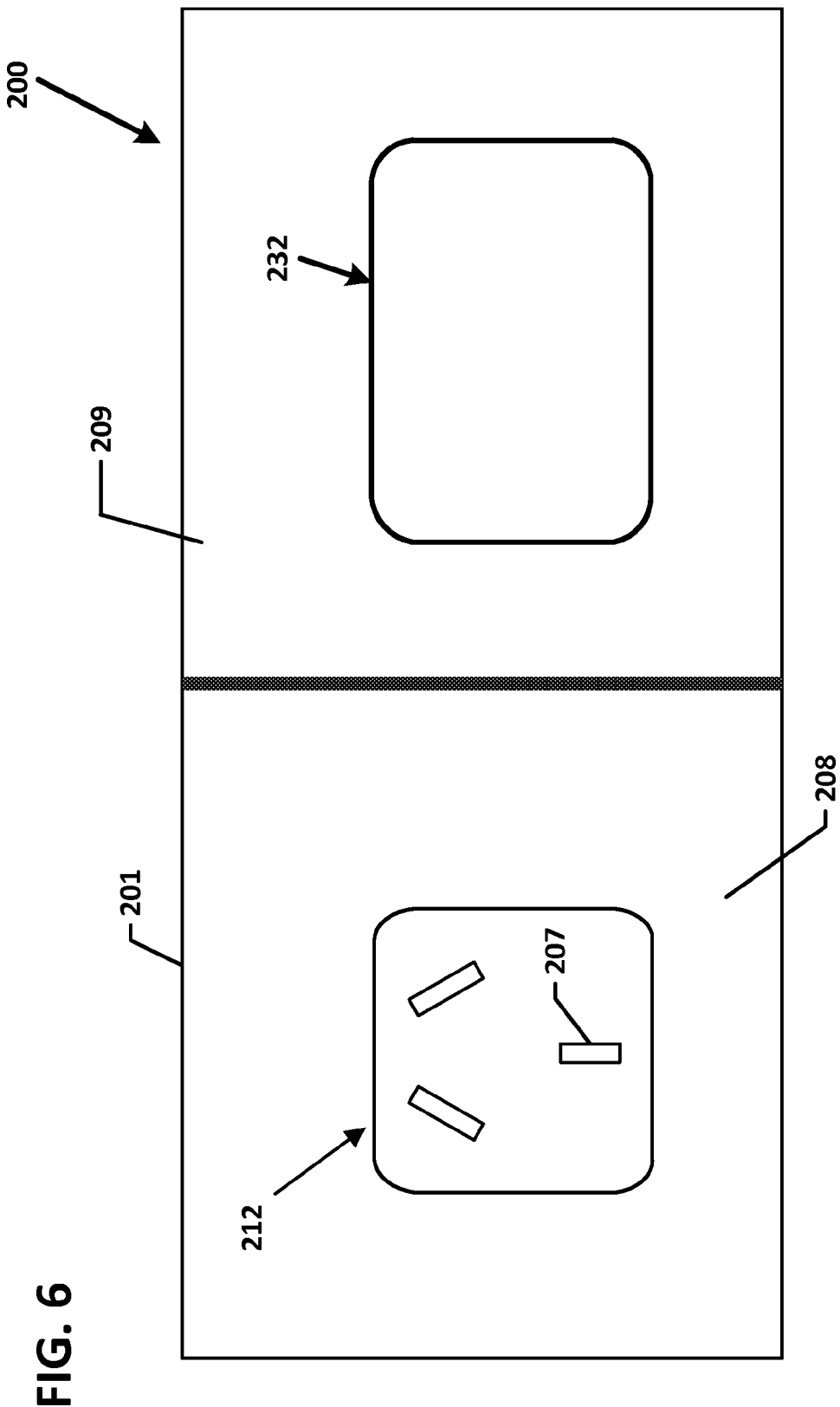
FIG. 6 is a front elevational view of another wall-mount box including a power receptacle disposed in a first interior region and accessible through a first front plate; the wall-mount box also including a second interior region in accordance with aspects of the disclosure.
Figure 7:
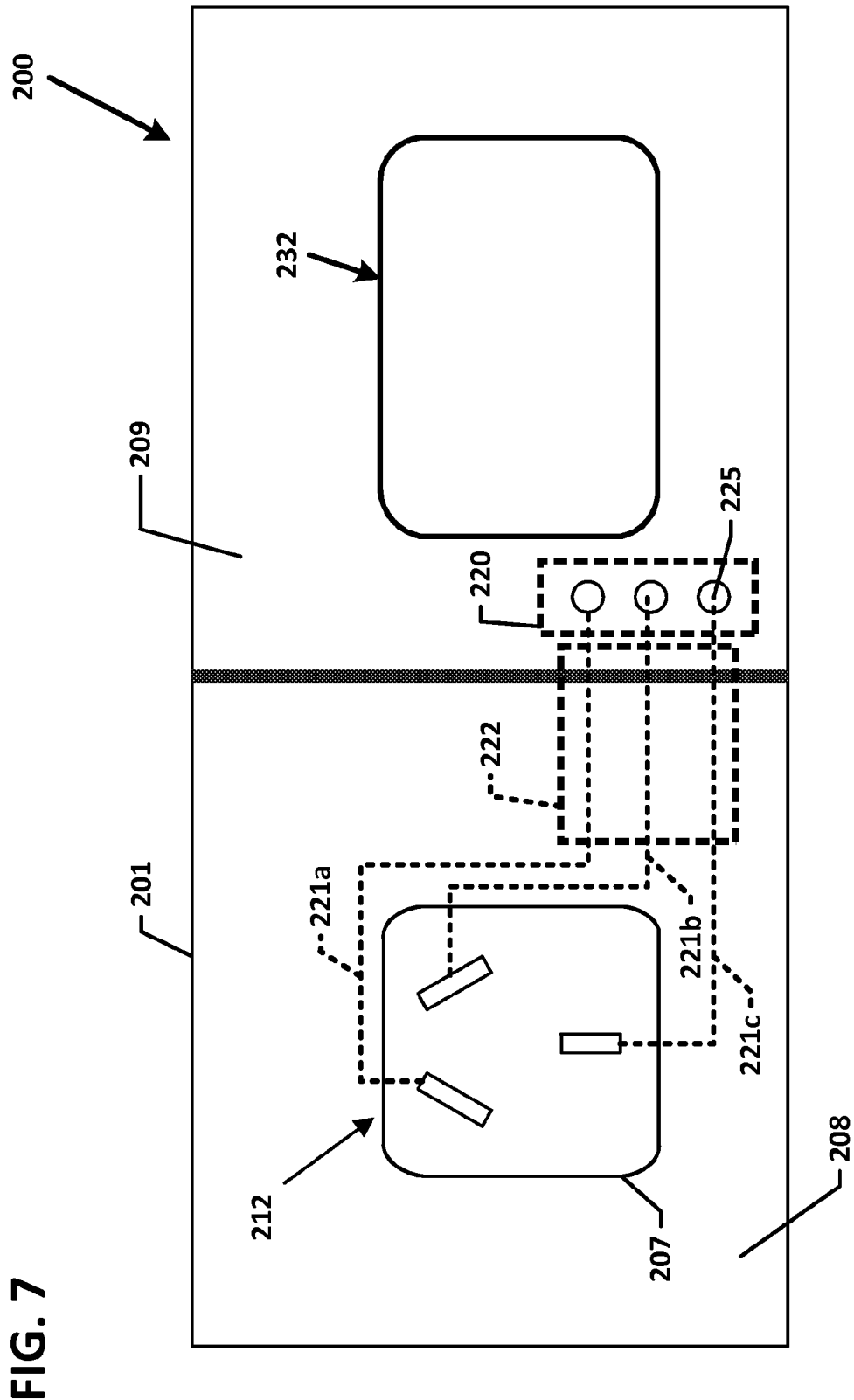
FIG. 7 is a front elevational view of the wall-mount box of FIG. 6 showing an internal connector interface electrically connected to the power receptacle.
Figure 8:
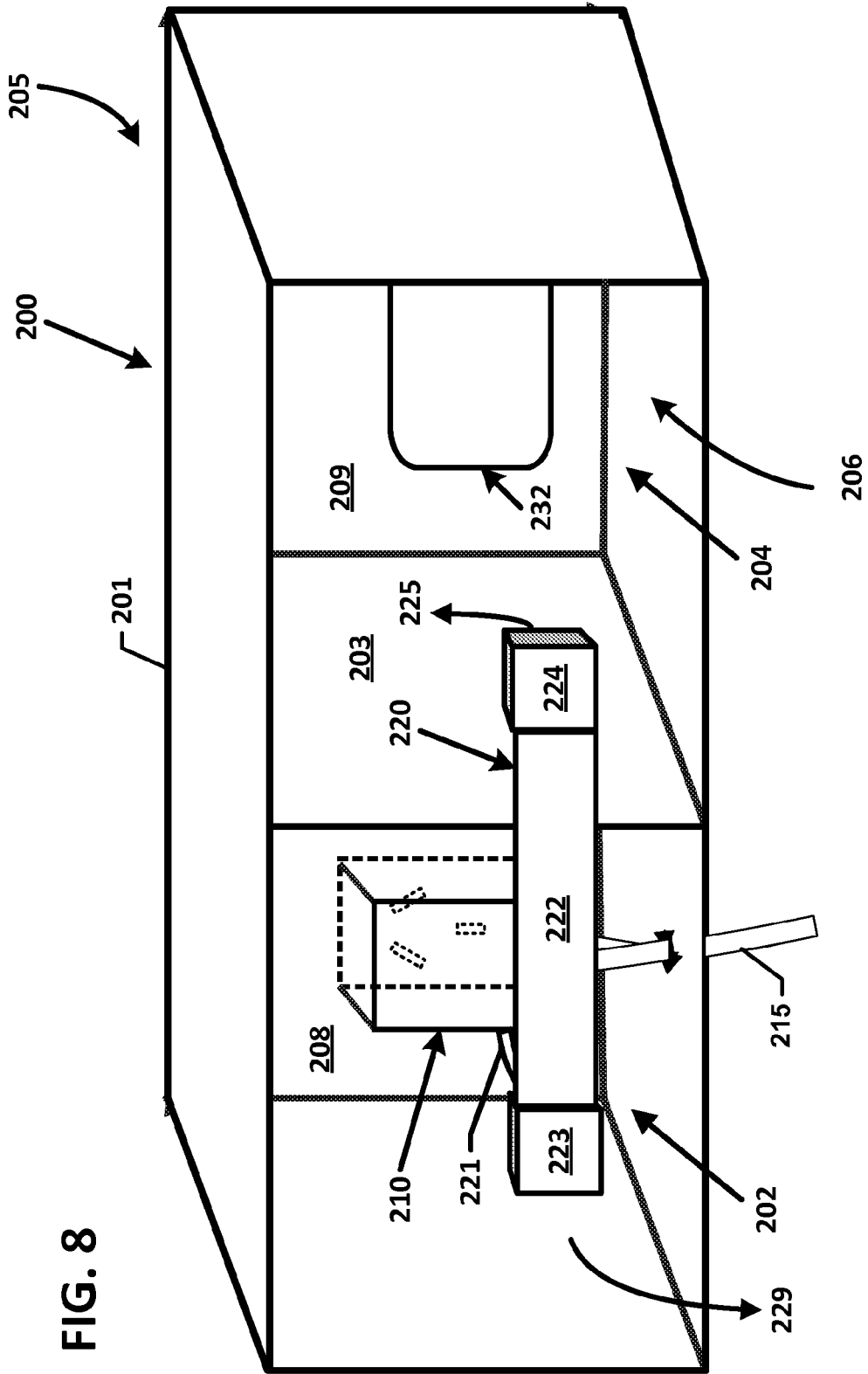
FIG. 8 is a schematic diagram showing a rear isometric view of the wall-mount box of FIG. 7 with the rear wall removed so that the internal connector interface is visible.

FIGS. 6-8 illustrate another example wall-mount box 200 including a body 201 defining a first interior region 202 and a second interior region 204. The body 201 has a front 205 and a rear 206. Each interior region 202, 204 borders both the front 205 and the rear 206. A power connector interface 210 is disposed in the first region 202. Power conducting wires 215 are routed to the power connector interface 210 (e.g., in the conventional way).

The first and second interior regions 202, 204 are separated by a barrier wall 203 or other divider that inhibits uncontrolled electrical discharges in one region 202, 204 from entering the other region 202, 204. In some implementations, the barrier wall 203 is formed of plastic or another insulating material. For example, the barrier wall 203 may be integrally formed with a plastic body 201. In another example implementation, a plastic insert may be secured within a metal box to separate the regions 202, 204. In other implementations, the barrier wall 203 may be integrally formed with a metal body 201. In still other implementations, the barrier wall 203 may be formed of metal and coupled to an insulative housing if the barrier wall 203 also includes a dedicated grounding connection.

In some implementations, the front 205 of the body 201 is open and the rear 206 of the body 201 is closed. One or more face plates may be disposed across the open front 205 of the body 201 to close the body 201. For example, in FIG. 6, a first face plate 208 is disposed over the front 205 of the body 201 to close the first interior region 202 and a second face plate 209 is disposed over the front 205 of the body 201 to close the second interior region 204. In other implementations, a single face plate may extend across the front 205 of the body 201. In still other implementations, the body 201 has a generally closed front 205 defining apertures and a generally open rear 206.

At least the first face plate 208 defines one or more through-passages 207 that provide access to the power connector interface 210 from an exterior of the body 201 through the front plate 208. For example, the through-passages 207 may provide access to receptacles 212 of the power connector interface 210. In some implementations, the receptacles 212 include conventional power receptacles that are sized and configured to receive the prongs of a plug of a conventional power cord. In the example shown, the receptacle 212 is sized and shaped to receive a AS/NZS 3112 type plug. In other implementations, however, the receptacle 212 may be sized and shaped to receive a power plug configured according to any standard worldwide (e.g., a CEE 7/16 type plug, a CEE 7/17type plug, a BS 546 type plug, a BS 1363 type plug, an SI 32 type plug, and NEMA 5 type plug).

In the example shown, the power connector interface 210 includes a single receptacle 212 and the first face plate 208 defines sufficient number of through-passages 207 for a single receptacle 212. In certain implementations, the first face plate 208 defines a single through-passage 207 per receptacle 212. In other implementations, the first face plate 208 may define a through-passage 207 for each receiving slot of the receptacle 212. In still other implementations, the power connector interface 210 includes multiple receptacles 212 and the first face plate 208 defines a sufficient number of through-passages 207 to accommodate each receptacle 212 or each slot of each receptacle 212

In some implementations, the second face plate 209 defines one or more through-passages 232. In the example shown in FIG. 6, the second face plate 209 defines one through-passage 232. In other implementations, the second face plate 209 may define a greater number of through-passages 232. The through-passages 232 provide access to one or more second receptacles 230 through the second front plate 209 as will be described in more detail herein.

As shown in FIGS. 7 and 8, an example internal connector interface arrangement 220 is disposed on the body 201 of the wall-mount box 200. The internal connector interface arrangement 220 is inaccessible through the front 205 of the body 201. In some implementations, the connector interface arrangement 220 is located at the rear 106 of the body 201. In certain implementations, the connector interface arrangement 220 includes a receptacle that extends through a rear wall 229 (FIG. 8) of the body 201. In various other implementations, however, the internal connector interface arrangement 220 may be located at a top wall, bottom wall, interior wall 203, or external side wall of the body 201.

The internal connector interface arrangement 220 is electrically connected to the power connector interface 210. In some implementations, one or more conductors 221 are hardwired from the power connector interface 210 to termination contacts of the internal connector interface 220. For example, an active conductor 221a, a neutral conductor 221b, and a ground conductor 221c may be routed to the internal connector interface 220. In other implementations, one or more conductors 221 are terminated at a plug that is inserted into a receptacle 223 of the internal connector interface 220.

The internal connector interface arrangement 220 defines a port 225 that is accessible from the second interior region 204. For example, the internal connector interface arrangement 220 includes a conduit 222 (FIG. 8) through which the conductors 221 are routed from the first interior region 202 to the port 225 at the second interior region 204. In some implementations, the conduit 222 includes a first receptacle 223 at which a connector from the power connector interface 210 may be plugged and a second receptacle 224 defining the port 225. Local power from the power connector interface 210 is provided to the port 225 of the internal connector interface 220.

In some implementations, the port 225 of the internal connector interface 220 is configured to receive an RJ plug (e.g., an RJ-45 plug). In other implementations, the port 225 of the internal connector interface 220 is configured to receive a USB plug (e.g., a conventional USB, a micro-USB, etc.). In still other implementations, the port 225 of the internal connector interface 220 is configured to receive a plug of a power cord (e.g., a NEMA 1 type plug, a NEMA 5 type plug, a CEE 7/16type plug, a CEE 7/17type plug, a BS 546 type plug, a BS 1363 type plug, an SI 32 type plug, and an AS/NZS 3112 type plug). In still other implementations, the port 225 may be configured to receive any type of plug capable of terminating electrical conductors.

Figure 9:
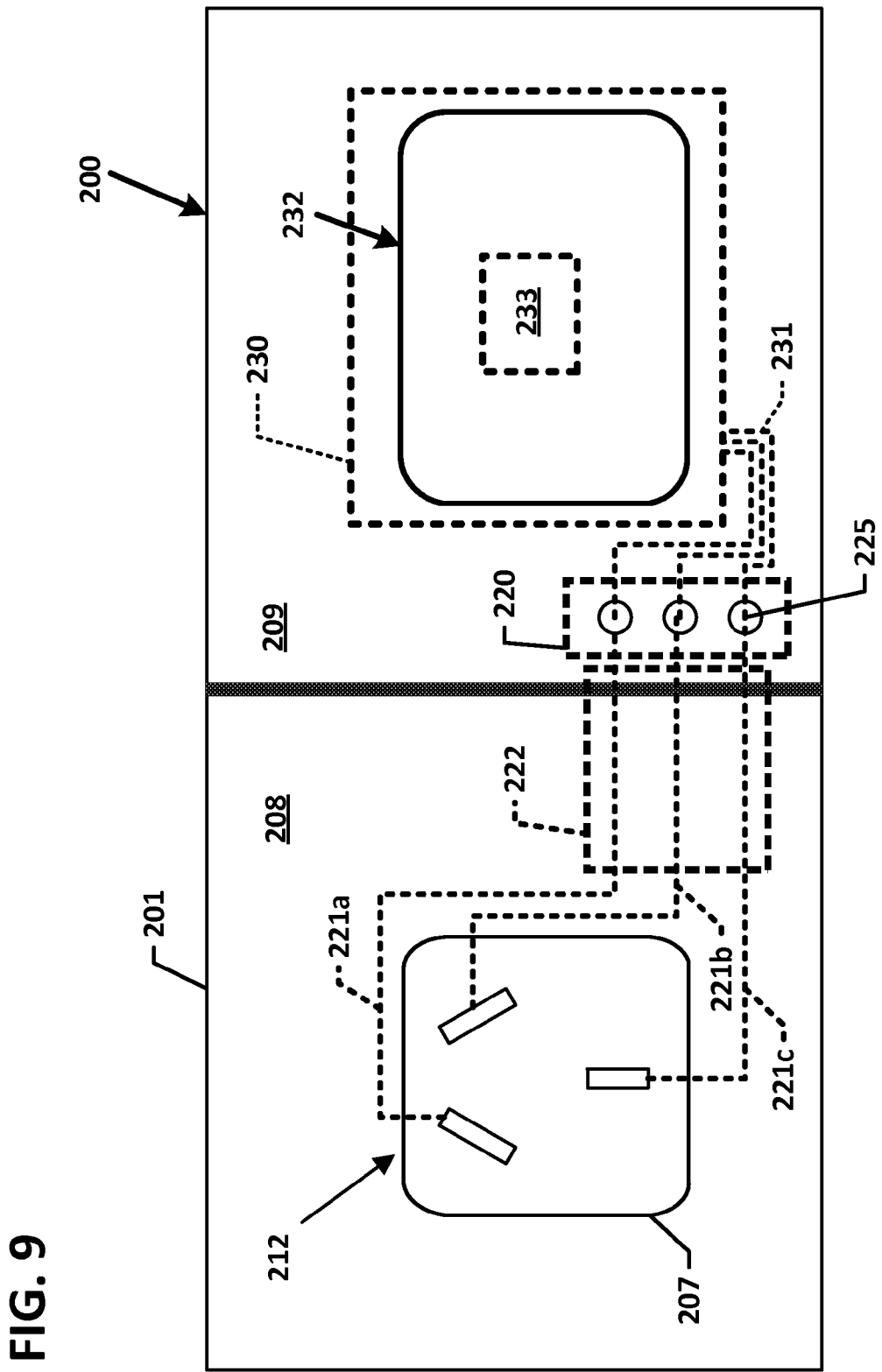
FIG. 9 is a front elevational view of the wall-mount box of FIG. 7 showing an electronic device disposed in the second interior region and electrically connected to the internal connector interface.
Figure 10:
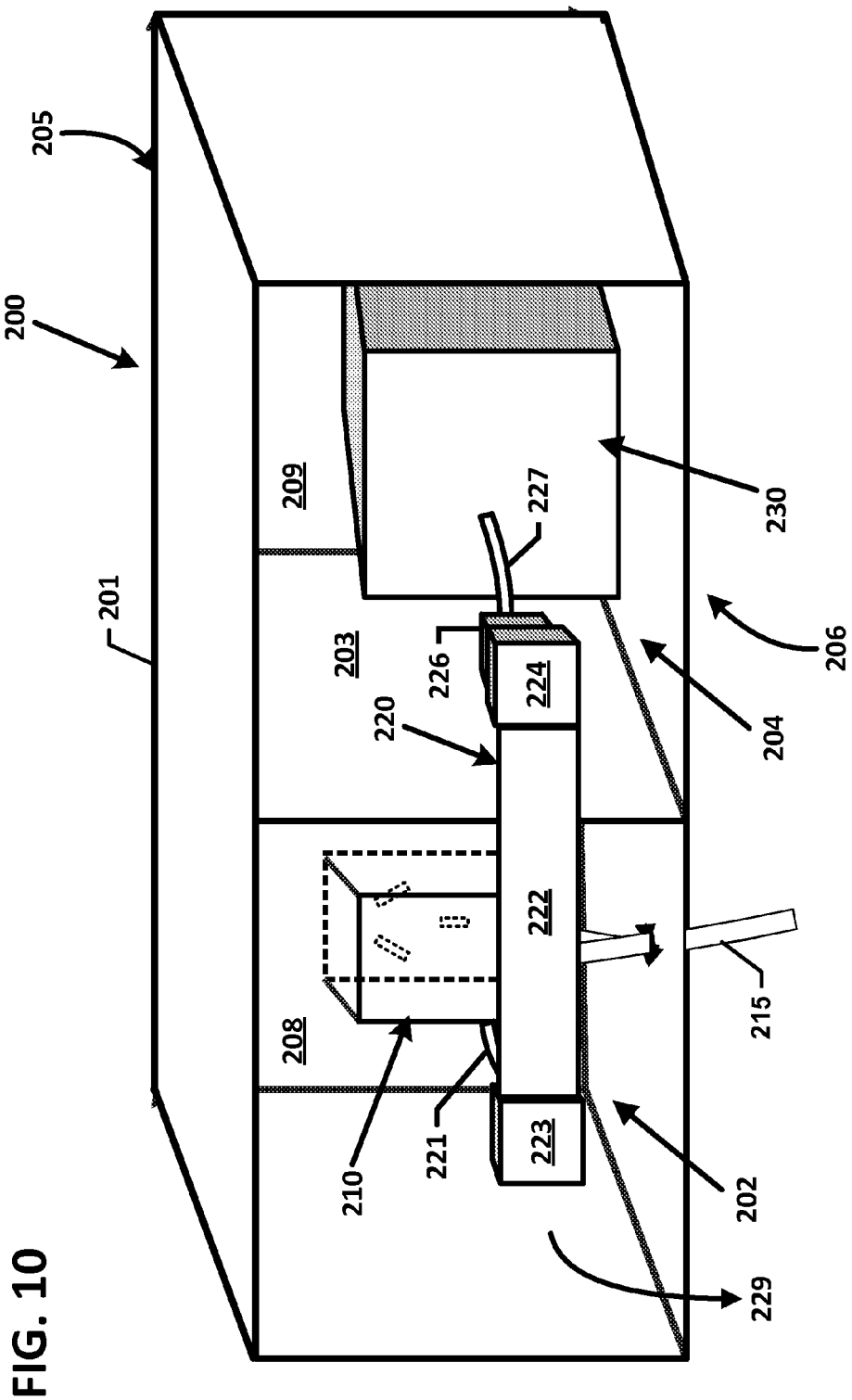
FIG. 10 is a schematic diagram showing a rear isometric view of the wall-mount box of FIG. 9 with the rear wall removed so that the electronic device and internal connector interface are visible.

FIGS. 9 and 10 show an electronic device 230 disposed in the second interior region 204 of the body 201. In some implementations, the electronic device 230 includes a media converter. In one implementation, the electronic device 230 converts AC power received from the internal connector interface 220 to DC power. In another implementation, the electronic device 230 converts a certain level of AC voltage to a different level of AC voltage. In other implementations, the electronic device 230 includes a router. In still other implementations, the electronic device 230 includes a repeater.

The electronic device 230 includes a dedicated connector 227 that is routed through the second interior region 204 and electrically connected to the internal connector interface arrangement 220 at the second interior region 204. For example, the dedicated connector 227 may be terminated at a plug 226 that is configured to be inserted into the port 225 of the internal connector interface arrangement 220 at the rear wall 229 of the body 201. In other implementations, the internal connector interface arrangement 220 includes a connector protruding into the second region 204 and the electronic device 230 defines a socket configured to receive the protruding connector. In still other implementations, a cable terminated at both ends may be routed between a receptacle defined by the internal connector interface arrangement 220 and a receptacle defined by the electronic device 230.

In some implementations, the electronic device 230 defines one or more second receptacles 233 that are accessible from an exterior of the body 201. For example, the second receptacles 233 may be aligned with the through-openings 232 to enable the second receptacles 233 to receive plugs from an exterior of the body through the front plate 209. In certain implementations, the second receptacles 233 define telephone jacks. In one implementation, the second receptacles 233 define USB jacks. In one implementation, the second receptacles 233 define RJ45 jacks. In certain implementations, the second receptacles 233 define optical fiber adapters. In other implementations, the electronic device 230 is coupled to one or more devices that define the second receptacles 233. In the example shown in FIG. 9, an example electronic device 230 is coupled (see lines 231) to one second receptacle 233.

In accordance with some aspects, the wall box 200 is manufactured by forming two interior regions 202, 204 in a body 201 of a wall box 200 by disposing a barrier wall 203 in a body 201 of the wall box 200. In certain implementations, the barrier wall 203 extends between the front 205 and rear 206 of the body 201. The barrier wall 203 also extends between the top and bottom of the body 201. An internal connector interface 220 is installed on the body 201. The internal interface 220 has a first side or port that is accessible from the first interior region 202 and a second side or port that is accessible from the second interior region 204.

For example, conductors 221 from the power interface 210 may be routed along a conduit 222 to the port 225. In some implementations, the conduit 222 extends along a rear wall 229 of the body 201 a sufficient distance to cross the barrier wall 203. In certain implementations, one end of the conduit 222 stops at a first receptacle 223 having a port accessible from the first interior region 202 and another end of the conduit 222 stops at a second receptacle 224 defining the port 225. In other implementations, the conduit 222 extends through the rear wall 229 of the body 201. In still other implementations, the conduit 222 extends through a bottom wall, top wall, or exterior side wall of the body 201.

In accordance with other aspects, the manufactured wall box 200 is installed in a wall so that the front 205 of the wall box 200 faces outward from the wall. A conventional power cable routed through the wall electrically connects the power interface 210 to the main power lines for the building or facility. The electronic device 230 is disposed in the second region 204 of the box 200 and electrically connected to the internal connector interface 220. For example, a dedicated connector 227 of the electronic device 230 may be routed to the rear wall 229 and plugged into a port 225 of the internal connector interface 220 to draw power from the power interface 210.

The electronic device 230 is connected to local power through the internal connector interface 220. In certain implementations, the electronic device 230 is connected to local power after the power interface 210 has been installed and connected to the main power lines. Because the second interior region 204 in which the electronic device 230 is disposed is isolated from the first interior region 202 in which the power interface 210 is disposed, an installer will not be shocked or electrocuted by the power interface 210 while installing the electronic device 230.

In certain implementations, one or more second receptacles 233 also are installed in the second interior region 204 of the wall box 200. The second receptacles 233 are coupled to the electronic device 230. For example, the electronic device may provide transformed power (e.g., AC to DC, change in voltage level, etc.) to the second receptacles 233. One or more front plates 208, 209 are installed over the open front 205 of the wall box 200 to close off the interior regions 202, 204 from the exterior of the wall.

Systems and methods consistent with the disclosure make possible the fabrication, installation, and use of dual purpose wall boxes using local power. The foregoing description of example features of the invention provides illustration and description, but is not intended to be exhaustive or to limit the invention to the precise form disclosed. Modifications and variations are possible in light of the above teachings or may be acquired from practice of the invention.

For example, the wall boxes 100, 200 may be implemented using two or more housing parts that are coupled together to form the bodies 101, 201, respectively. In certain implementations, a first housing part may form the first interior region 102, 202 and may include the internal connector interface arrangement 120, 220. A second housing part may be coupled to the first housing part to form the second interior region. In one implementation, the second housing part may define an open side that is covered by the barrier wall 103, 203 of the first housing part. In other implementations, the second housing part also may include a side wall that abuts a barrier wall of other wall of the first housing part. In some such implementations, the sidewall may define an aperture sized to receive the internal connector interface arrangement 120, 220 of the first housing part. In other such implementations, the side wall may be solid. In certain such implementations, the side wall also may be a barrier wall. In still other implementations, the second housing part may include an internal connector interface arrangement 120, 220.

No element, act, or instruction used in the description of the invention should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The above specification, examples and data provide a complete description of the manufacture and use of the composition of the invention. Since many embodiments of the invention can be made without departing from the spirit and scope of the invention, the invention resides in the broad inventive aspects disclosed herein.

The invention claimed is:

1. A wall box comprising: a body having a front and a rear, the body defining a first interior region and a second interior region that each border the front and the rear of the body, the second interior region is isolated from the first interior region by at least one barrier wall;
   a power connector interface disposed in the first interior region, the power connector interface having a first port that is accessible through the front of the body, the first port being configured to receive a plug of a power cable to provide local power to the power cable; and
   an internal connector interface arrangement disposed on the body, the internal connector interface arrangement being unaccessible through the front of the body, the internal connector interface arrangement being coupled to the power connector interface and defining a port accessible from the second interior region of the body, wherein local power from the power connector interface is provided to the port of the internal connector interface arrangement.

2. The wall box of claim 1, wherein the internal connector interface arrangement. arrangement also has a second port accessible from the first interior region of the body to couple the internal connector interface arrangement to the power connector interface.

3. The wall box of claim 2, wherein the internal connector interface arrangement is disposed through the barrier wall separating the first and second interior regions.

4. The wall box of claim 1, wherein the internal connector interface arrangement is disposed through a barrier wall at the rear of the body, wherein conductors are routed from the power connector interface, through the rear of the body, to a second port of the internal connector interface arrangement that is accessible from an exterior of the body to provide the local power to the port of the internal connector interface arrangement.

5. The wall box of claim 4, wherein a conduit coupled to the rear of the body encloses the conductors, the conduit being routed between the rear of the body at the first interior region and the second port of the internal connector interface arrangement.

6. The wall box of claim 1, further comprising a second connector interface disposed in the second interior region, the second connector interface having a first port that is accessible through the front of the body, the second connector interface being coupled to the port of the internal connector interface arrangement.

7. The wall box of claim 6, wherein the second connector interface includes a dedicated connector that is configured to be received in the port of the internal connector interface arrangement.

8. The wall box of claim 6, wherein the second connector interface includes a media converter.

9. The wall box of claim 6, wherein the second connector interface includes a router.

10. The wall box of claim 6, wherein the second connector interface includes a repeater.

11. A method of installing a wall box comprising: providing a wall box housing a local power receptacle that is accessible from a front of the wall box, the local power receptacle being electrically connected to an internal connector interface;

installing the wall box in a wall so that the front of the wall box faces outward from the wall;

disposing an electronic device in the wall box at a location that is physically isolated from the local power receptacle;

electrically connecting the electronic device to the internal connector interface so that the electronic device draws power from the local power receptacle; and disposing a second receptacle in the wall box at the location that is physically isolated from the local power receptacle, the second receptacle being electrically connected to the electronic device, the second receptacle being accessible from the front of the wall box, and wherein the second receptacle does not provide local power.

12. The method of claim 11, wherein the second receptacle is integral with the electronic device.

13. The method of claim 11, further comprising supplying local power to the local power receptacle of the wall box after installation and before electrically connecting the electronic device to the internal connector interface.

14. The method of claim 11, wherein electrically connecting the electronic device to the internal connector interface comprises plugging a dedicated connector of the electronic device into a port of the internal connector interface.

15. The method of claim 14, wherein plugging the dedicated connector of the electronic device into the port of the internal connector interface comprises routing the dedicated connector to a barrier wall that separates the wall box into isolated regions and inserting the dedicated connector into an adapter that extends through the barrier wall, the adapter defining the port of the internal connector interface.

16. The method of claim 14, wherein plugging the dedicated connector of the electronic device into the port of the internal connector interface comprises routing the dedicated connector to an outer wall of the wall box and inserting the dedicated connector into an adapter that extends through the outer wall, the adapter defining the port of the internal connector interface.

17. The method of claim 11, further comprising precabling the local power receptacle to the internal connector interface prior to installation of the wall box in the wall.

18. The method of claim 17, wherein precabling the local power receptacle to the internal connector interface comprises routing conductors from the local power receptacle to termination contacts of the internal connector interface.

19. The method of claim 18, wherein routing conductors from the local power receptacle to termination contacts of the internal connector interface comprises routing at least a portion of the conductors outside of the wall box.

20. The method of claim 17, wherein precabling the local power receptacle to the internal connector interface comprises routing a dedicated connector of the local power receptacle to a second port of the internal connector interface.

\* \* \* \* \*